Patented Feb. 28, 1933

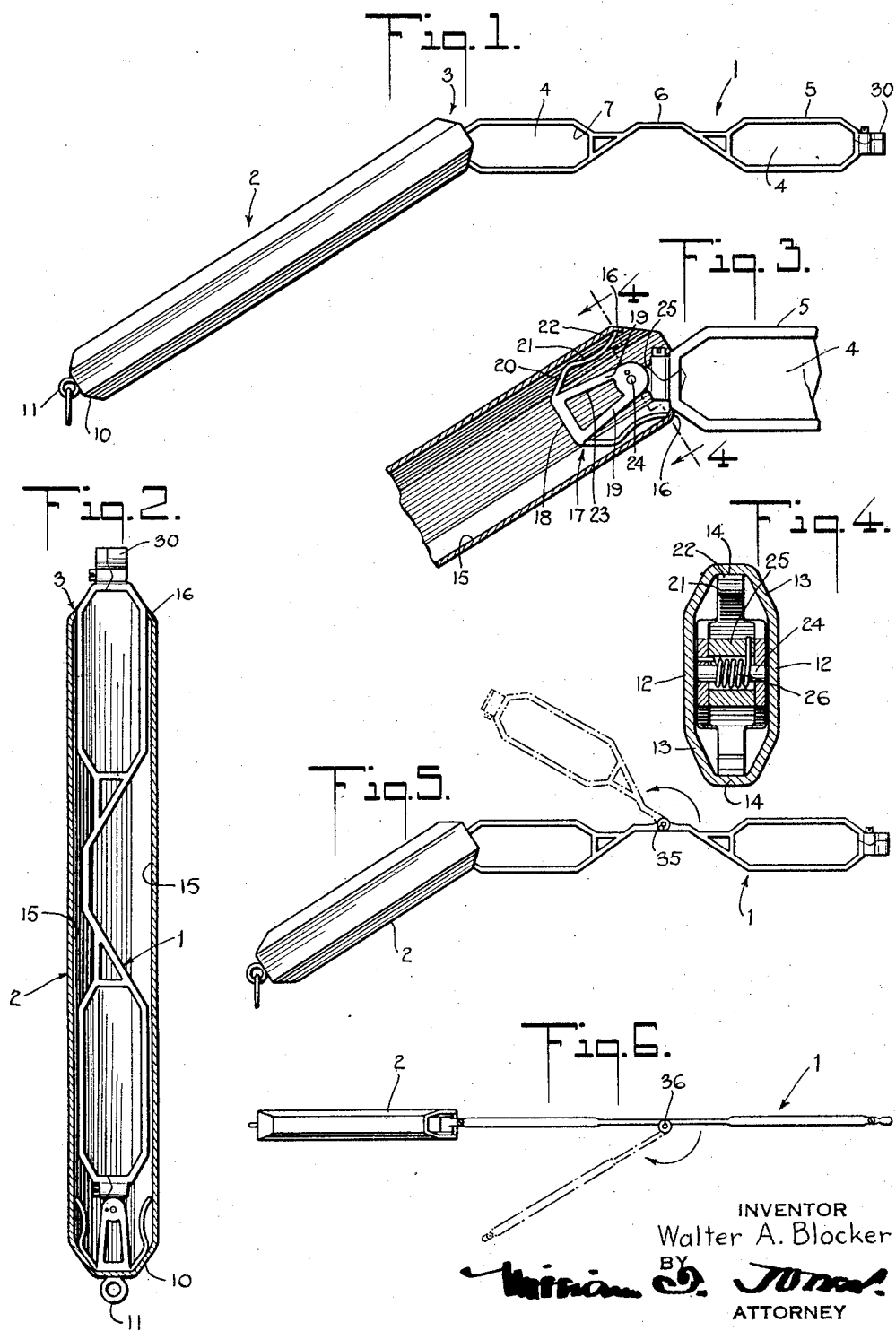

1,899,664

UNITED STATES PATENT OFFICE

WALTER A. BLOCKER, OF MOUNT VERNON, NEW YORK, ASSIGNOR TO LUGENE INC., OF NEW YORK, N. Y., A CORPORATION OF NEW YORK

LORGNETTE

Application filed October 8, 1930. Serial No. 487,114.

My invention relates to lorgnettes, or eyeglasses or spectacles in which the lens frame is foldably mounted on a handle; and the principal objects are:

To provide a lorgnette of small dimensions and compact form, which may conveniently be carried in a pocket, hand-bag, or the like; which is of a highly decorative appearance, comparable to articles of jewelry; and is easily "opened" for use, and when opened, automatically adjusts itself to proper position for use.

These and other objects and advantages are realized in the structures here disclosed, in which The lenses are relatively narrow in the vertical direction, in a lens frame of correspondingly small width or vertical dimension, and the handle is in the form of a hollow case of correspondingly small width, with a sliding and pivotal connection by which the lens frame may be moved to extended position, outside the case, and will then be automatically moved to the desired angular position in relation to the handle for use, or may be inserted into and completely enclosed within the handle by a slight pivotal and sliding movement.

I have found that a satisfactory field of vision may be obtained, for the purposes of lorgnette glasses or the like, when the lenses are very narrow, vertically, in comparison with the similar dimension in ordinary eyeglasses or spectacles; and by providing such vertically narrow lenses, in conjunction with other features briefly referred to above, I am enabled to provide a handle-case which completely encloses and protects the lens frame and lenses when not in use, and which is at the same time of very compact dimensions, being practically no longer than the length of the lens frame, and having a width very slightly greater than that of the lens frame, and thickness approximately only one-half the width, or less; so that the lorgnette when folded may be very conveniently carried in small space, as in a pocket or pocketbook, or suspended from a chain. Thus the size and convenience of carrying and use of the article are comparable to the characteristics of a small fountain pen or adjustable pencil.

The lorgnette may also be made in any of a variety of materials with artistic and decorative appearance or finish, as in other articles of jewelry.

While narrow lenses, as above referred to, are preferred in many cases for the sake of compactness, the lens width may be increased, if desired, for optical reasons, with corresponding increase in the width-wise direction of the case-handle but without increasing other dimensions, and retaining the advantages of the pivot and slide connection of the lens frame to the handle.

The characteristics and advantages of the invention are further sufficiently explained in connection with the following detail description of the accompanying drawing, which shows representative embodiments. After considering these examples, skilled persons will understand that many variations may be made without departing from the principles disclosed, and I contemplate the employment of any structures that are properly within the scope of the appended claims.

Fig. 1 is a front elevation of a lorgnette, embodying the invention in one form, with the lens frame withdrawn or extended, ready for use;

Fig. 2 is a longitudinal section in the plane of the lenses and lens frame, showing the lens frame in idle or "closed" position, within the case or handle;

Fig. 3 is a partial section, enlarged, in the plane of Fig. 2, showing the lens frame in extended position;

Fig. 4 is a transverse section at 4—4, Fig. 3;

Fig. 5 is an elevation, showing a modified form of lens frame and corresponding modification of the handle or case; and Fig. 6 is an edge view showing another modified form of lens frame.

In Figs. 1 to 4, 1 is the lens frame as a whole, and 2 the handle, in the form of a hollow or tubular case, open at one end, 3, through which the lens frame is moved to extended position, or collapsed position within the case.

In the lens frame 1, the lenses 4 are for the sake of compactness, preferably of elongated form, that is, they are relatively narrow in relation to their length, and the length may also be somewhat less than the length or horizontal dimension of an ordinary eye-glass lens, since I have found that with the stated dimensions a sufficient field of vision and otherwise satisfactory optical results may be obtained for the purposes of a lorgnette. The lenses are held in lens loops 5 of any usual or suitable construction, such as lens wire of channel cross-section, and the lens holders or loops are connected by a bridge 6 which is of curved form to accommodate the bridge of the nose when in use, without extending beyond the vertical or width-wise dimension of the lenses. For decorative appearance the corners of the lenses may be cut obliquely as at 7, and adjacent parts of the lens loops may be similarly formed, or these parts may be rounded or the general lens and lens loop contour may be oval, as desired.

The handle 2, as above stated, is of tubular form, consisting of sheet material of moderate thickness and sufficient stiffness for protection of the lens frame and lenses; and the handle, as well as the lens frame, may be of any suitable material, such as precious or semi-precious metals or alloys, imitation shell, synthetic resins, etc. The size and shape of the handle may vary in accordance with the shape or dimensions of the lens frame or lenses. For the lens frame of form or shape described, the handle as viewed in side elevation, Fig. 1, is of generally oblong form with end corners shaped diagonally to correspond to the diagonal formations of the outside end corners of the lenses and lens frame. As above stated, one end, 3, of the case is open, and the other end, 10, is closed and may have secured thereto an eye 11 for connection to a chain or snap ring. This flange also serves as a closure for the handle when the frame is in a non-functional position, as exhibited in Figure 2.

As best explained in the transverse section, Fig. 4, the side walls of the case includes central, flat portions 12 spaced apart sufficiently to accommodate the greatest width of the slide structure (later described), with converging marginal strips or portions 13, and these are connected by narrow edge strips 14; the inner faces of the converging marginal portions and the edge portions 14 form opposite guide channels 15 (Fig. 2) for elements of the slider. At the open end 3 of the case the ends 16 of the edge strips 14 are bent obliquely inward to form stops for the ends of the slider spring members, as also later referred to.

The lens frame is slidably and pivotally connected to the case by a slider 17 of spring sheet metal, cut and bent or pressed to form the central or bottom portions 18, from the sides of which extend parallel side arms or plates 19; and from the ends extend spring strips 20 which first project angularly, and are then formed with curved portions 21 terminating in ends 22 which yieldingly engage and slide in channels 15 in the case edges, above referred to. The side arms or plates 19 may be apertured as at 23 for the sake of lightness. Their ends embrace and are pivotally connected, as by a pin 24, to an eye 25 formed on or secured to the lens frame at one end thereof. The eye has an internal diameter sufficient to accommodate a coiled spring 26, Fig. 4, the ends of which are connected respectively to the eye and to one of the arm ends 19 adjacent the pin 24, as well shown in Figs. 3 and 4, and the spring is tensioned so that when the lens frame is withdrawn from the case the spring acts automatically to tilt the frame until an end portion engages one of the stop members 16 of the case (Fig. 3) and is thus retained at an angle to the case-handle, to properly position the lenses in relation to the eyes, when the handle is held in a natural position.

When the lens frame is withdrawn from the case the ends 22 of the slider springs slide outward in the channels 15 until they are stopped by engagement with the stop member 16 of the handle and thereupon the spring pivot structure acts in a manner just described to tilt or angularly position the lens frame.

To return the frame to enclosed position it is only necessary to slightly tilt it to a straight alignment with the handle and then push it inward, whereupon the slider moves inward to the bottom of the case, and the lens frame is also guided and centered in the case by movement of its edge portions in the guide channels, so that the lenses cannot contact with the sides of the case, and breakage is practically impossible.

To facilitate withdrawal of the lens frame this frame may have at the outer end a handle extension or rounded flange portion 30 for convenient finger grasping.

The lens frame, or especially the bridge, is dimensioned, or may be properly adjusted, by bending or other usual methods, to adjust the distance between lens center in accordance with pupilary distance of the user.

The lengthwise dimension of the lorgnette when closed may be further reduced by properly jointing and folding the lens frame. Thus, as shown in Fig. 5, the lens frame or its bridge may have a central hinge 35, so that the lenses may be folded in their own plane to parallel position; or, as shown in Fig. 6, the hinge 36 may have its axis in the vertical plane of the lenses and in this case one lens will swing in a horizontal arc flat against the other, as indicated by dot-and-dash lines in the respective features; and in either case the lengthwise dimension of the handle may be substantially only one-half that of the lens frame when in extended position.

I claim:

1. A lorgnette comprising a lens frame and lenses therein, the overall width of the frame corresponding substantially to the width of the lenses, a tubular handle-case open at one end, a slider movable longitudinally within the handle, and a pivotal connection between the slider and the lens frame, the slider including opposite spring arms engaging within edge formations of the handle.

2. A lorgnette comprising a lens frame and lenses therein, the overall width of the frame corresponding substantially to the width of the lenses, a tubular handle-case open at one end, a slider movable longitudinally within the handle, a pivotal connection between the slider and the lens frame, and means acting between the slider and lens frame at the pivotal connection to tilt the lens frame to angular position in relation to the handle when withdrawn therefrom, the handle having a cross-sectional form providing internal guide channels at opposite edges, and the slider having opposite spring arms engaging in the guide channels.

3. A lorgnette comprising a lens frame and lenses therein, the overall width of the frame corresponding substantially to the width of the lenses, a tubular handle-case open at one end, a slider movable longitudinally within the handle, a pivotal connection between the slider and the lens frame, and means acting between the slider and lens frame at the pivotal connection to tilt the lens frame to angular position in relation to the handle when withdrawn therefrom, the handle having a cross-sectional form providing internal guide channels at opposite edges, and the slider having opposite spring arms engaging in the guide channels, the handle edge walls being inbent at the open ends of the channels forming stops engaged by the ends of the spring arms to limit outward movement of the slider and lens frame.

4. A lorgnette comprising a lens frame and relatively long and narrow lenses therein, the overall width of the frame corresponding substantially to the width of the lenses, a tubular handle-case open at one end, a slider movable longitudinally within the handle, a pivotal connection between the slider and the lens frame, and means acting between the slider and lens frame at the pivotal connection to tilt the lens frame to angular position in relation to the handle when withdrawn therefrom, the handle having a cross sectional form providing internal guide channels at opposite edges, and the slider having opposite spring arms engaging in the guide channels.

5. A lorgnette comprising a lens frame and relatively long and narrow lenses therein, the overall width of the frame corresponding substantially to the width of the lenses, a tubular handle-case open at one end, a slider movable longitudinally within the handle, a pivotal connection between the slider and the lens frame, and means acting between the slider and lens frame at the pivotal connection to tilt the lens frame to angular position in relation to the handle when withdrawn therefrom, the handle having a cross-sectional form providing internal guide channels at opposite edges, and the slider having opposite spring arms engaging in the guide channels, the handle having a length substantially no greater than the length of the lens frame.

6. A lorgnette comprising a lens frame and lenses therein, a tubular handle case designed to telescopically receive the frame, a slider movable longitudinally within the handle, and a pivotal connection between the slider and lens frame, the slider including opposite spring arms engaging within edge formations of the handle.

Signed at New York, New York.

W. A. BLOCKER.